Sept. 1, 1970      E. E. MATTHEWS      3,526,053
FISHING GAFF

Filed Nov. 25, 1968      2 Sheets-Sheet 1

EDWARD E. MATTHEWS
INVENTOR

BY *John C. Stahl*

ATTORNEY

Sept. 1, 1970    E. E. MATTHEWS    3,526,053
FISHING GAFF
Filed Nov. 25, 1968    2 Sheets-Sheet 2
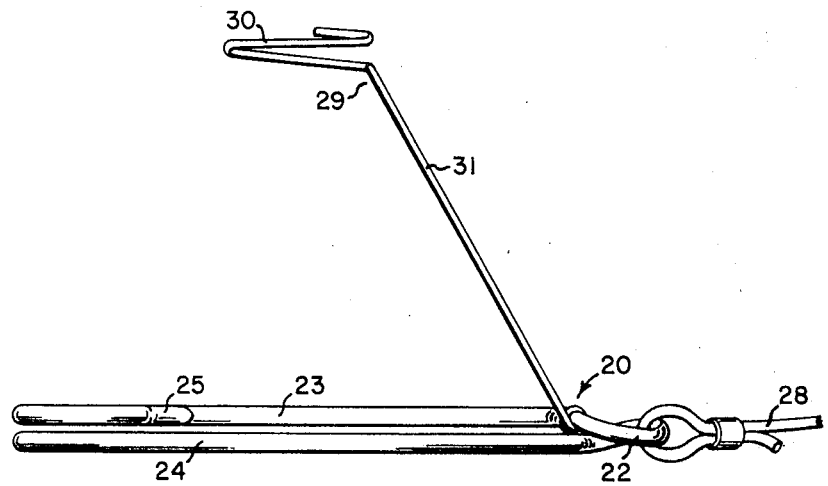
FIG. 4
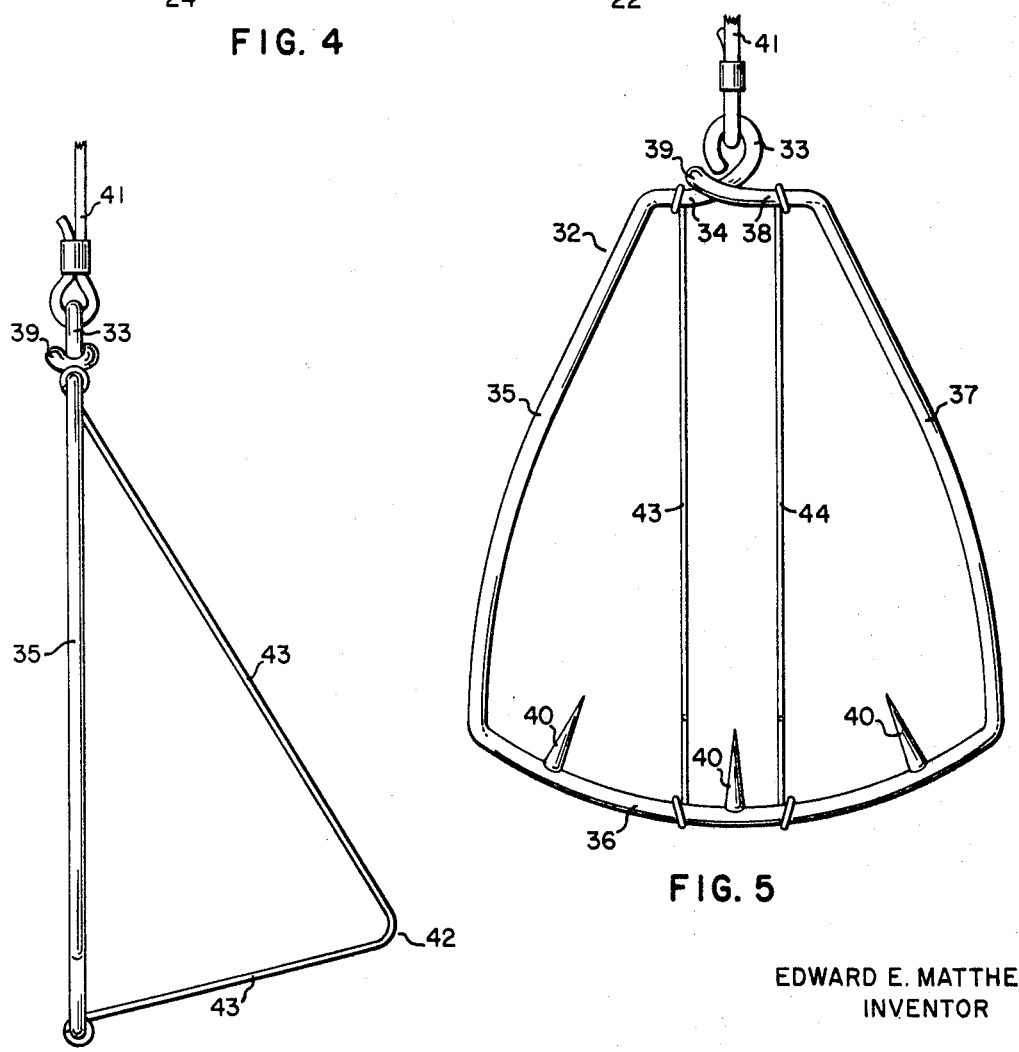
FIG. 6    FIG. 5
EDWARD E. MATTHEWS
INVENTOR
BY 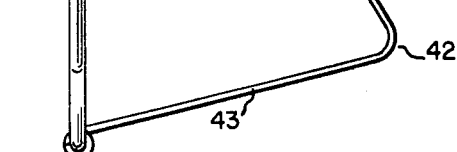
ATTORNEY

United States Patent Office 3,526,053
Patented Sept. 1, 1970

3,526,053
FISHING GAFF
Edward E. Matthews, McAllen, Tex.
(P.O. Box 1394, Galveston, Tex. 77550)
Filed Nov. 25, 1968, Ser. No. 778,535
Int. Cl. A01k 97/14
U.S. Cl. 43—5                                    7 Claims

ABSTRACT OF THE DISCLOSURE

A fishing gaff comprising a shaped member including a loop on one end and a hook on the other end adapted to engage said member in proximity to said loop, a line secured to said loop, a plurality of spaced and inwardly extending tines on said member, the shaped member and tines in a common plane, a fishing line guide secured to said shaped member, said gaff passed downwardly on a fishing line to engage a first caught on said fishing line, said guide preventing the fish from passing through said shaped member.

---

The present invention relates to a fishing gaff and more particularly to a fishing gaff which is to be placed on a fishing line and slidably lowered on said line to engage a fish caught thereon for landing the same.

Prior to the subject invention, fish landing devices and nets have been utilized in connection with a fishing line to aid in landing fish. Although such devices have served the purpose, they have not proved entirely satisfactory under all conditions of service for the reason that the fisherman often has to observe the fish before gaffing the same or the fish passes completely through the gaff.

An object of the present invention is the provision of an improved fishing gaff whereby the fisherman does not have to see the fish to gaff the same.

Another object is to provide a light weight fishing gaff with a minimum number of working parts.

Still another object is to provide a fishing gaff which does not become entangled in or damage the fishing line during use.

A further object of the invention is the provision of a fishing gaff which is simple in construction, inexpensive to manufacture, capable of mass production techniques, universal in its adaptability, and extremely easy to use and maintain in serviceable condition.

Other objects and features of the invention will become apparent to those skilled in the art as the disclosure is made in the following detailed description of preferred embodiments of the invention as illustrated in the accompanying sheets of drawing in which:

FIG. 4 is a side elevational view of the embodiment of FIG. 3.

FIG. 5 is a top plan view of still another embodiment of the invention; and

FIG. 6 is a side elevational view of the embodiment of FIG. 5.

Figure 1:
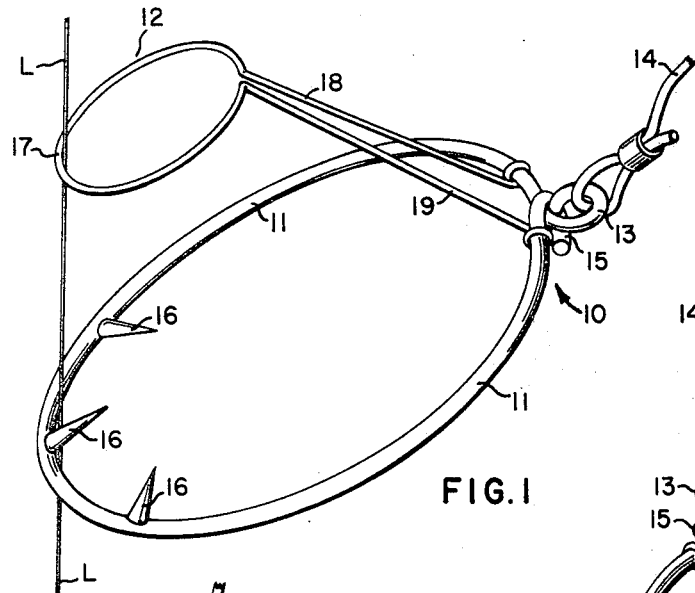
FIG. 1 is a pictorial view showing the preferred embodiment of fishing gaff of the subject invention passing downwardly on a fishing line.
Figure 2:
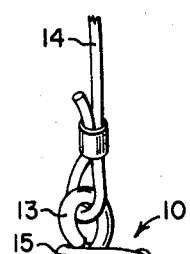
FIG. 2 is another pictorial view showing the embodiment of FIG. 1 in essentially vertical condition with a fishing line passing therethrough.

Referring now to the drawings, wherein like reference characters designate like or corresponding parts throughout the several views, there is shown in FIGS. 1–2 a preferred embodiment of the fishing gaff 10 comprising band 11 to which is secured a fishing line guide 12. Band 11 of the preferred embodiment terminates at one end in a closed loop 13 which is preferably but not necessarily in a common plane with the said band. An elongated rope or line 14, preferably of nylon or the like, is conventionally secured to loop 13. The opposite end of band 11 includes hook 15 which lies in a plane perpendicular to that of the said band and is adapted to engage band 11 in proximity to loop 13. Band 11 thus formed may vary from six to thirty-six inches in diameter and is desirably constructed of stainless steel, aluminum alloy, bronze or other rust-resistant composition.

A plurality of spaced, inwardly extending tines 16, preferably of the same composition as the band, are secured to the said band 1 as by welding or the like; the longitudinal axis of each such tine is in a common plane with band 11.

Fishing line guide 12, heretofore mentioned, is secured to a selected portion of band 11 whereby fish may not pass through the said band. In the embodiment of FIGS. 1–2 of the drawings, guide 12 consists of a split ring 17 which opens toward loop 13, the said ring is approximately centered and maintained in spaced relation to the said band by means of angularly extending and slightly divergent supports 18–19 which are conventionally secured to band 11 laterally of loop 13 and hook 15, respectively.

In use, after a fish has been caught on the hook of the fishing tackle, the fisherman disengages hook 15 from band 11, slightly distends the band whereby there is an opening between loop 13 and hook 15, and with ring 17 extending upwardly, passes fishing line L through the opening thus formed. Hook 15 is then again secured to band 11.

As best seen in FIG. 1 of the drawings, fishing line L passes through split ring 17 and thence through the bore of band 11; the downward descent of gaff 10 is stopped by guide 12 bearing against the fish's head. At such time the fisherman pulls upwardly on rope 14 causing band 11 to rotate and tines 16 at least partially penetrate the fish's body. The fish may then be raised into the boat, bridge, wharf or the like by the fisherman by means of rope 14.

Alternatively, as viewed in FIG. 2 of the drawings, gaff 10 may be lowered in the manner heretofore described to a desired depth. By reeling in or pulling upon fishing line L the head and upper body portions of the fish pass through band 11 and are stopped by guide 12 at which time the fisherman may pull on rope 14 causing tines 16 to engage the fish.

Figure 3:
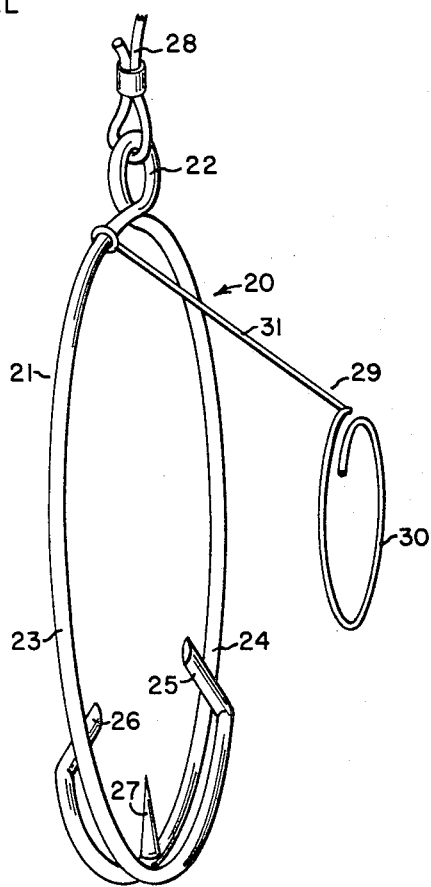
FIG. 3 is a pictorial view of another embodiment of the invention.

There is shown in FIGS. 3–4 of the drawings another gaff 20 constructed in accordance with the principles of the invention. More particularly, split band 21 is generally circular in plan, consisting of a closed loop 22 with integrally formed and outwardly extending, partially overlying, arcute segments 23–24. Arcuate segment 23 extends at least one hundred eighty degrees and preferably approximately two hundred degrees in a counterclockwise direction from loop 22 and terminates in a perpendicularly inturned, sharpened portion 25 lying in a common plane with the said arcuate segment. Segment 24 extends at least one hundred eighty degrees and preferably approximately two hundred degrees in a clockwise direction from loop 22, the overlying portions of segments 23, 24 are spaced and segment 24 terminates in a perpendicularly inturned, sharpened portion 26 lying in a common plane with segment 24. An inwardly extending tine 27 is spaced intermediate sharpened portions 25, 26 and may be secured in a conventional manner to either segment 23 or 24. An elongated line 28 or the like is secured to loop 22 heretofore described.

Still referring to FIGS. 3–4 of the drawings, fishing line guide 29 consists of a split ring 30 which is approximately centered and maintained in spaced relation generally paralleling the said band 21 by means of angularly extending support 31 which is secured in a conventional manner to either segment of the band laterally of loop 22.

To pass the fishing gaff 20 thus formed around fishing line L, the fisherman first turns band 21 with segments 23, 24 essentially vertical and passes fishing line L therebetween; gaff 20 is then rotated in such a manner that ring 30 is uppermost. At such time, fishing line L may be passed through ring 30 and the said gaff used in the manner heretofore described.

Such embodiment of the invention has proven especially useful in that the arcuate segments 23, 24 may either be bent inwardly or extended to accommodate a fish of any size.

It is to be understood that the invention is not to be restricted solely to the use of an essentially circular band or the like, but the invention also encompasses the use of an oval, triangular or other regular or irregularly shaped member. For example, in the embodiment of FIGS. 5-6 of the drawings, an integrally formed, generally bell-shaped, split band 32 terminates at one end in a closed loop 33; the said band further includes an outwardly extending segment 34, downwardly and outwardly curved segment 35, laterally and outwardly curved segment 36, upwardly and inwardly curved segment 37, and inwardly extending segment 38, such segments lying in a common plane; loop 33 may lie in such common plane or may be angled relative thereto. Hook 39 is integral with segment 38 and is adapted to engage segment 34 in proximity to loop 33.

A plurality of spaced and inwardly extending tines 40 are secured to segment 36 in a conventional manner. Rope 41 is conventionally secured at one end to loop 33.

In such embodiment of the invention guide 42 consists of parallel, spaced and outwardly curved supports 43-44 which are secured at one end to segment 36 laterally of the center line thereof and at the other end to segment 34 laterally of loop 33 and to segment 38 laterally of hook 39, respectively.

In use, the fisherman first disengages hook 39 and slightly separates the said hook from loop 33 whereby fishing line L may be passed therethrough. Hook 39 is again secured and the gaff is ready to use, in the manner heretofore described.

It should be understood, of course, that guide 29 of FIGS. 3-4 and guide 42 of FIGS. 5-6 may be secured to band 11 of FIG. 1 of the drawings. Furthermore, guide 12 of FIGS. 1-2 and guide 29 of FIGS. 3-4 may be used in combination with band 32 of FIGS. 5-6 of the drawings.

What is claimed is:
1. A fishing gaff comprising
   a split-shaped member having first and second ends,
   a loop on the first end of said shaped member,
   a hook on the second end of said shaped member,
   said hook adapted to engage said shaped member in proximity to said loop,
   a plurality of spaced tines secured to said shaped member and extending inwardly,
   said shaped member and said tines lying in a common plane,
   a line secured to said loop, and
   a fishing line guide secured to said shaped member.
2. The invention of claim 1 wherein said fishing line guide consists of a split ring, said ring spaced from said shaped member and secured downwardly to at least one side of said shaped member laterally of said loop.
3. The invention of claim 1 wherein said fishing line guide consists of a split ring terminating in first and second supports, said first support secured to said shaped member laterally of said loop, and said second support secured to said shaped member laterally of said hook.
4. The invention of claim 1 wherein said fishing line guide consists of parallel and outwardly curved supports secured to said shaped member laterally of the center line thereof.
5. A fishing gaff comprising:
   a shaped member having a loop intermediate oppositely extending first and second arcuate segments,
   a line secured to said loop,
   said first arcuate segment at least partially overlying said second arcuate segment and spaced therefrom,
   said first arcuate segment terminating in an inturned sharpened portion lying in a common plane with said first arcuate segment,
   said second arcuate segment terminating in an inturned sharpened portion lying in a common plane with said second arcuate segment, and
   a fishing line guide secured to said shaped member.
6. The invention of claim 5 wherein said fishing line guide consists of a split ring, said ring spaced from said shaped member and secured thereto laterally of said loop.
7. The invention of claim 5 wherein said fishing line guide consists of a split ring terminating in first and second supports, said first support secured to said shaped member laterally of said loop, said second support secured to said shaped member laterally of said hook.

References Cited

UNITED STATES PATENTS

| | | | |
|---|---|---|---|
| 3,163,955 | 1/1965 | Lockwood | 43—17.2 |
| 3,246,415 | 4/1966 | Forbes | 43—17.2 |
| 3,336,067 | 8/1967 | Cloyd | 43—17.2 |
| 3,375,601 | 4/1968 | Matthews | 43—5 |

WARNER H. CAMP, Primary Examiner